(12) United States Patent
Fitzpatrick

(10) Patent No.: US 10,194,202 B2
(45) Date of Patent: Jan. 29, 2019

(54) APPARATUS AND METHOD FOR CONTROLLING AN AUDIO/VIDEO CONNECTION IN A DEVICE

(71) Applicant: THOMSON LICENSING, Issy les Moulineaux (FR)

(72) Inventor: John James Fitzpatrick, Indianapolis, IN (US)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/121,409

(22) PCT Filed: Mar. 10, 2015

(86) PCT No.: PCT/US2015/019571
§ 371 (c)(1),
(2) Date: Aug. 25, 2016

(87) PCT Pub. No.: WO2015/138373
PCT Pub. Date: Sep. 17, 2015

(65) Prior Publication Data
US 2016/0373818 A1    Dec. 22, 2016

Related U.S. Application Data

(60) Provisional application No. 61/950,455, filed on Mar. 10, 2014.

(51) Int. Cl.
*H04N 21/443*       (2011.01)
*H04N 21/4363*      (2011.01)
*H04N 21/442*       (2011.01)

(52) U.S. Cl.
CPC ....... *H04N 21/4436* (2013.01); *G06F 1/3203* (2013.01); *G06F 1/3265* (2013.01);
(Continued)

(58) Field of Classification Search
CPC ................. H04N 21/4436; H04N 5/63; H04N 21/43615; H04N 21/4365; H04N 21/4424;
(Continued)

(56) References Cited

U.S. PATENT DOCUMENTS 7,411,631 B1 * 8/2008 Joshi ........................ H04N 5/63
348/730
2009/0046205 A1 * 2/2009 Strasser ................... H04N 5/63
348/634
(Continued)

FOREIGN PATENT DOCUMENTS

EP        2391056        11/2011
WO    WO2009144626    12/2009

OTHER PUBLICATIONS

International Search Report of PCT/US2015/019571 dated Apr. 5, 2015.

*Primary Examiner* — Nathan J Flynn
*Assistant Examiner* — Cynthia M Fogg
(74) *Attorney, Agent, or Firm* — Joseph J. Opalach

(57) ABSTRACT

An apparatus and method for controlling an audio/video connection in a device is described. The method includes entering a first state in response to a user input, the first state powering a portion of circuits, detecting the presence of a signal, the signal to be output from the device for display on a display device, and entering a second state if the presence of the signal is detected, powering circuits for outputting the received signal. The apparatus includes a standby circuit, receiving a user input placing the apparatus into a first state, a receiving circuit detecting the presence of a signal in the first state and providing a signal to place the apparatus in a second state if the signal is detected, and a processing circuit being operational in the second state, the signal processing
(Continued)

circuit outputting the signal for display on a display device in the second state.

35 Claims, 7 Drawing Sheets

(52) U.S. Cl.
CPC ..... *G06F 1/3287* (2013.01); *H04N 21/43635* (2013.01); *H04N 21/4424* (2013.01)

(58) Field of Classification Search
CPC ............ H04N 21/43635; G06F 1/3203; G06F 1/3265; G06F 1/3287; G06F 1/3237; G06F 1/325; G09G 2370/12
USPC .......................................................... 725/78
See application file for complete search history.

(56) References Cited

U.S. PATENT DOCUMENTS

| | | | |
|---|---|---|---|
| 2010/0033026 A1* | 2/2010 | Goto ...................... | H04N 5/765 307/126 |
| 2011/0026613 A1* | 2/2011 | Mari ...................... | G06F 1/3237 375/259 |
| 2011/0145808 A1* | 6/2011 | Mountain .............. | G06F 1/3203 717/171 |
| 2011/0154414 A1* | 6/2011 | Kimoto ............... | H04L 25/0272 725/78 |
| 2013/0159753 A1 | 6/2013 | Richardson | |
| 2015/0077641 A1* | 3/2015 | Ohmae ................ | H04N 21/436 348/730 |

\* cited by examiner

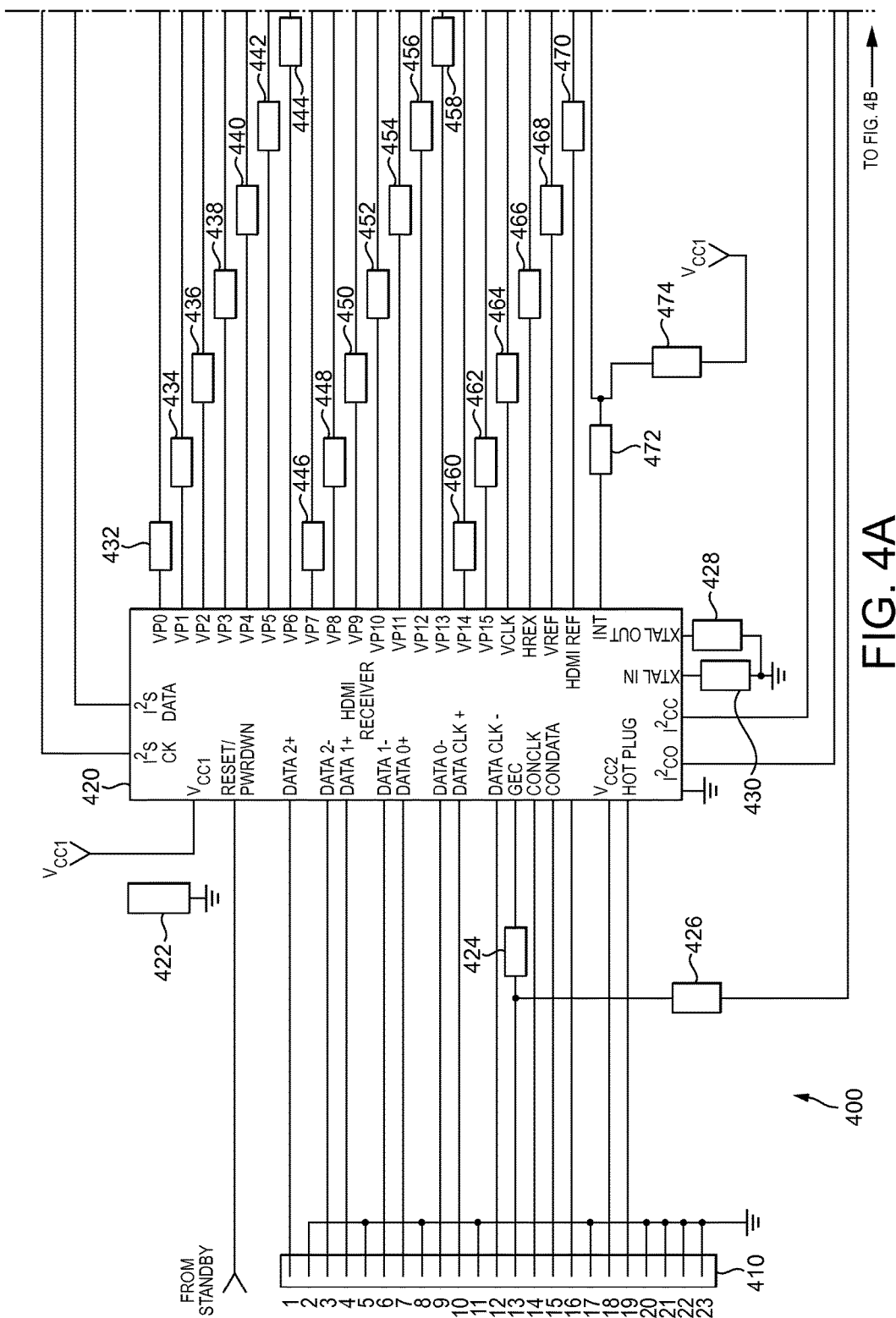

APPARATUS AND METHOD FOR CONTROLLING AN AUDIO/VIDEO CONNECTION IN A DEVICE

CROSS-REFERENCE TO RELATED APPLICATION

This application claims the benefit, under 35 U.S.C. § 365 of International Application PCT/US2015/019571, filed 10 Mar. 2015, which was published in accordance with PCT Article 21(2) on 17 Sep. 2015 in English and which claims the benefit of U.S. provisional patent application No. 61/950,455, filed 10 Mar. 2014.

TECHNICAL FIELD OF THE INVENTION

The present disclosure generally relates to devices that include audio/video connections and signal processing. More specifically, the present disclosure relates to an apparatus and method for controlling the connection of audio/video signals between devices, particularly when a device is operating in a low power mode.

BACKGROUND OF THE INVENTION

This section is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Many home entertainment devices not only include the capability to receive and/or process available media content but also include the ability to communicate with other devices in a home network. These devices often include, but are not limited to, set-top boxes, gateways, televisions, home computers, media content players, and the like. Further, many of these devices may include multiple interfaces for different types of home networks as well as inter-device communication and signaling. These devices may also include additional features internal to the device, such as storage elements, hard drives, compact disk (CD), or digital versatile disk (DVD) drives, and the like.

One approach to configuring a home media distribution network involves using a central gateway device connected to thin client set top boxes located throughout a home or dwelling. The thin client set top boxes typically connect to the central gateway using a wired or wireless interface, such as the Multimedia over Cable Alliance (MoCA) standard. The thin client set top box interfaces to a home display device, such as a television or monitor, through an audio/video interface, such as the High Definition Multimedia Interface (HDMI) or similar analog or digital signal interface. The thin client set top box may also include an audio/video input interface (e.g., HDMI) for connecting a home media content player (e.g., hard drive device, CD player, video cassette recorder (VCR), or DVD player). The thin client device may provide a signal, received from either the central gateway device or from the home media content player, for display on the display device.

Power consumption management remains an important issue with home entertainment devices, particularly as more devices are used and available in the home. Many home entertainment devices include a full function operating mode as well as a standby mode when plugged into electrical power. In many cases, the standby mode does not completely power down the device so that the device may continue to have some functional capability. However, in some cases, the standby operating mode may not operate at a power consumption low enough to meet requirements or energy standards, such as Energy Star. Further, the standby operating mode may either not power on or alternatively not power off the proper elements in the device in order to maintain certain specific functional operation, such as operation involving other external devices connected to the home entertainment device.

In particular, a thin client set top box may have a standby mode that at a very low power consumption level with only power applied for user control. However, a thin client set top box may also serve as an interface between a home media content player and a display device. The thin client set top box could include always powering the audio/video interface circuits as part of the standby mode but this would raise the power consumption level, especially when the interface is not in use. Further, turning the thin client set top box on for full operation involves even higher power consumption and may additionally be inconvenient to the user. Therefore, there is a need to incorporate an additional operational control mode in a device, such as a thin client set top box, for connecting, or passing, the audio/video signals through the device from a content source to a display device without fully powering on the device.

SUMMARY

According to an aspect of the present disclosure, a method for controlling an audio/video connection in a device is described. The method includes entering a first operational state in a device in response to a user input, the first operational state powering a portion of circuits in the device, detecting the presence of a signal received at an input to the device, the received signal to be output from the device for display on a display device, and entering a second operational state in the device if the presence of the signal is detected, the second operational state powering circuits for outputting the received signal.

According to another aspect of the present disclosure, an apparatus for controlling an audio/video connection is described. The apparatus includes a standby processing circuit, the standby processing circuit receiving an input from a user, the input for placing the apparatus into a first operational state, a signal receiving circuit coupled to the standby processing circuit, the signal receiving circuit detecting the presence of a signal received at the signal receiving circuit in the first operational state, the signal receiving circuit providing a signal to place the apparatus in a second operational state if the presence of the signal is detected, and a signal processing circuit coupled to the signal receiving circuit and standby processing circuit, the signal processing circuit being operational in the second operational state but not in the first operational state, the signal processing circuit outputting the signal received in the signal receiving circuit for display on a display device in the second operational state.

BRIEF DESCRIPTION OF THE DRAWINGS

These and other aspects, features and advantages of the present disclosure will be described or become apparent from the following detailed description of the preferred embodiments, which is to be read in connection with the accompanying drawings.

FIG. 4A and FIG. 4B are a circuit diagram of an exemplary audio/video connection circuit used in a device in accordance with the present disclosure;

Figure 1:
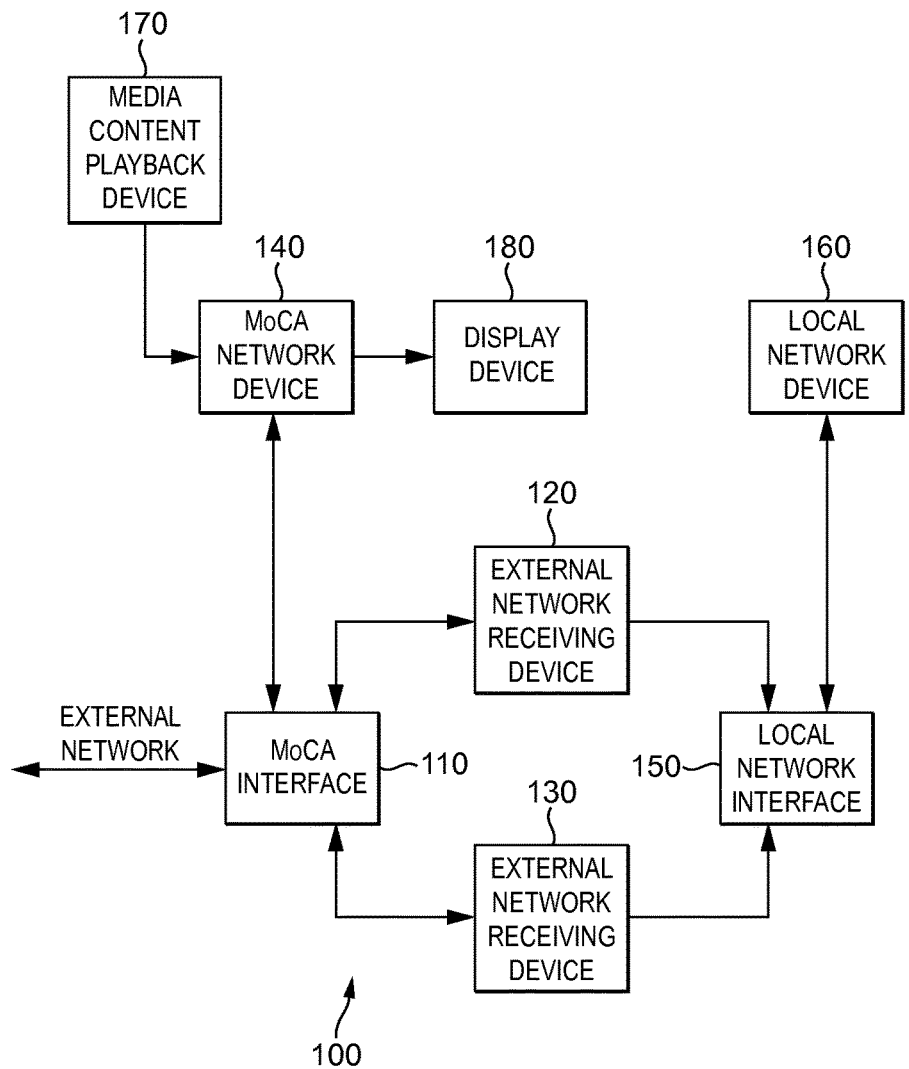
FIG. 1 is a block diagram of an exemplary signal receiving system in a home or dwelling in accordance with the present disclosure.

It should be understood that the drawing(s) are for purposes of illustrating the concepts of the disclosure and is not necessarily the only possible configuration for illustrating the disclosure.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present disclosure is directed at the problems related to controlling the operation of a home entertainment device in a low power consumption condition while still including the capability to determine the presence and passing audio and/or video signals through the device. Certain home entertainment devices, such as network connected client devices, often provide one or more communications interfaces between a main device (e.g., settop box or gateway) and other devices in the home network. Service providers use this architecture in order to provide a common single interface to the provider network and to provide a common content storage and delivery point to other points in the home network. These devices may further provide a connection interface and control mechanism when the client device is used as an interface between a content source device (e.g., DVD player, VCR, and the like) and a display device. The present embodiments are directed at a mechanism for operating these interfaces that also satisfies low power consumption requirements.

The embodiments of the present disclosure are related to controlling an audio/video connection in a device. The embodiments identify a device and process that utilize a full power mode as a well as a plurality of alternative standby modes. A first standby mode, also often referred to as standby mode or active standby mode, include powering the audio/video input circuit (e.g., HDMI input) and monitoring the input for signal activity. If activity at the audio/video input circuit is detected, then, (the functions necessary to route the audio and/or video signals through to an audio/video output circuit connected to the display device. As a result, an additional standby mode, referred to as pass through mode or HDMI pass through mode is created that does not involve full operation for the device (e.g., not powering on the entire device).

The embodiments may also include a further standby mode. The further standby mode, referred to as off mode, deep standby mode, or deep off mode, may maintain operation of a certain set of functions, such as specific functions in the microprocessor, that may speed the starting up the client box. The further standby mode may also include certain functions operating in a lower power (e.g., lower clocking rates on devices). The further standby mode may be initiated after a certain time period of no activity (e.g., three hours). The second standby mode may also be initiated when the device is first turned off and maintained in this mode for a time period before going to one of the other standby modes.

Described herein are mechanisms for implementing a signal pass through mode for HDMI signals while maintaining a low power standby operation in a client or network device operating in a home cable signal distribution system. It is important to note that these mechanisms may be adapted for use in other systems requiring a signal pass through mode while maintain low power standby operation. For instance, with only minor modifications, the embodiments described below could be modified by a skilled artisan to work in a network connected device in a home satellite signal or home terrestrial signal distribution system. Further, these mechanisms may also be adapted to operate with other inter-device media communication and connection protocols other than HDMI including, but not limited to, digital video interface (DVI), digital flat panel (DFP) and plug and display (P&D).

Turning now to FIG. 1, a block diagram of an embodiment of a system 100 for providing home entertainment media content in a home, or end user, network is shown. The media content, originating from a content provider, is provided through an external network to a Multimedia over Cable Alliance (MoCA) interface 110. The media content may be provided using any one of the standard transmission protocols and standards for content delivery (e.g., Advanced Television Systems Committee (ATSC) A/53, digital video broadcast (DVB)-Cable (DVB-C), DVB-Satellite (DVB-S), or DVB-Terrestrial (DVB-T)). MoCA interface 110 is connected to external network receiving device 120, external network receiving device 130, and MoCA network device 140. Both external network receiving device 120 and external network receiving device 130 connect to local network interface 150. Local network interface 150 connects to local network device 160. Media content playback device 170 connects to MoCA network device 140. MoCA network device 140 connects to display device 180. The components shown in system 100 comprise a home network configured to provide media content to multiple locations within the home using one or more home communication networks.

A signal containing media content (e.g., audio, video, and/or data) from the external network is provided over a physical media, such as co-axial cable. The external network interfaces to MoCA interface 110. MoCA interface 110 provides a routing mechanism for the signal from the external network to devices in the home or user network (e.g., external network receiving device 120 and external network receiving device 130) in conjunction with signals that operate in the MoCA network with the home or user network. Moca interface 110 may include active or passive circuit elements that may split or separate the input signal into different or similar output signals. Moca interface 110 may use amplifiers, frequency filters, and electromagnetic circuits to split or separate the signal. In one embodiment, the external network provides a signal on a co-axial cable between the frequency range of 20 Megahertz (MHz) and 800 MHz. The MoCA network operates using signals in the frequency range from 950 MHz to 1,250 MHz. In an alternative embodiment, the external network provides a signal between the frequency range of 950 MHz and 2,150 MHz with the MoCA network operating in the frequency range of 425 MHz to 625 MHz. MoCA interface 110 provides a signal splitting for signals from the external network and a separate signal splitting for signals on the MoCA network while preventing signals from the MoCA network from being output to the external network.

External network receiving device 120 and external network receiving device 130 may each operate and function in a similar manner. External network receiving device 120 and external network receiving device 130 receive the signal from the external network through the MoCA interface 110. External network receiving device 120 and external network receiving device 130 may receive different types of media content (e.g., different channels) from either the external network or from other devices in the home network through either MoCA interface 110 or local network interface 150. External network receiving devices 120 and 130 tune, demodulate, decode, and process the received content and provide the content for display and use by a user in the home. External network receiving devices 120 and 130 may further provide a separation of the media content based on instructions provided with the content or over the external network. External network receiving devices 120 and 130 may also process and separate media content based on instructions received via user commands. External network receiving devices 120 and 130 may also provide storage, such as a hard drive or optical disk drive, for recording and/or storing the media content as well as providing the content for playback to other devices in a home network (e.g., MoCA network device 140 and local network device 160). The operation and function of an external network receiving device, such as discussed here, will be described in further detail below. External network receiving devices 120 and 130 may be one of a settop box, home media server, computer media station, home network gateway, multimedia player, modem, router, home network appliance, or the like.

External network receiving devices 120 and 130 provide interfaces for communicating signals on the MoCA network through MoCA interface 110 to and from other MoCA network devices (e.g., external network receiving devices 120 and 130 and MoCA network device 140). External network receiving devices 120 and 130 also provide interfaces to a local home network through local network interface 150 to local network device 160. In one embodiment, the local network is an Ethernet network. In addition, the local network may be a wireless network. Wireless communication using a wireless network may include physical interfaces to accommodate one or more wireless formats including Wi-Fi, Institute of Electrical and Electronics Engineers standard IEEE 802.11 or other similar wireless communications protocols.

MoCA interface 110 provides MoCA network signals between external network receiving device 120, external network receiving device 130, and MoCA network device 140. MoCA network device 140 tunes, demodulates, and decodes MoCA signals for display and use by a user. MoCA network device 140 may also transmit or communicate signals on the MoCA network for delivery to other devices (e.g., external network receiving device 120 or 130). These signals may provide control or identification information for media content to be delivered to the MoCA network device 140. The MoCA network device 140 is often referred to a thin client MoCA device and may be, but is not limited to, a settop box, setback box, computer device, tablet, display device, television, wireless phone, personal digital assistant (PDA), gaming platform, remote control, multi-media player, or home networking appliance that includes a MoCA interface, and may further include a storage media for digital video recording. MoCA network device 140 may also include a storage device, such as a hard drive or optical disk drive, for recording and playing back audio and video content.

Local network interface 150 provides the routing and signal communication and management functions between devices communicating across the local network. In one embodiment, local network interface 150 operates as a signal router for communicating using internet protocol routing protocols as part of an Ethernet network.

Local network interface 150 provides local network signals between external network receiving device 120, external network receiving device 130, and local network device 160. Local network device 160 also may tune, demodulate, and/or decode the local network signals for display and use by a user depending on the communication protocol used. Local network device 160 may also transmit or communicate signals on the local network for delivery to other devices (e.g., external network receiving device 120 or 130). These signals may provide control or identification information for media content to be delivered to the local network device 160. The local network device 160 is often referred to a thin client device and may be, but is not limited to, a computer device, tablet, display device, television, wireless phone, personal digital assistant (PDA), gaming platform, remote control, multi-media player, or home networking appliance that includes a local network interface. Local network device 160 may further include a storage media for digital media recording.

Media content playback device 170 provides local source playback for one or more formats of media content from an internal or separate media element. Media content playback device 170 may include a compact disc (CD) DVD drive, Blu-Ray drive, a hard disk drive, an electronic memory, or other storage or storage access element. Media content playback device 170 reads the media content from the media element and outputs the media content in one or more audio/video signal formats (e.g., HDMI). The audio/video signals are provided to MoCA network device 140.

Display device 180 receives audio/video signals from the MoCA network device 140 and displays them. The audio/video signal may either be from media content playback device 170 or may be from external network receiving devices 120 and 130 through MoCA interface 110. Display device 180 may be a conventional two-dimensional (2-D) type display or may alternatively be an advanced three-dimensional (3-D) type display.

It is important to note that external network receiving devices 120 and 130 and local network device 160 may include display capability or may be connected an external display device, not shown (e.g., display device 180). Further, external network receiving devices 120 and 130 and local network device 160 may include interfaces for connecting a media content playback device, such as media content playback device 170, not shown. It should be appreciated that other devices having display capabilities including, but not limited to, computer devices, tablets, gateways, display devices, televisions, wireless phones, PDAs, computers, gaming platforms, remote controls, multi-media players, home networking appliances or the like, may employ the teachings of the present disclosure and are considered within the scope of the present disclosure.

In operation, system 100 provides the networking and communication capability for connecting and sharing media content between devices in a user's home using either the MoCA network or the local network or both networks. In one embodiment, media content for a particular program is tuned by external network receiving device 120 and provided to MoCA network device 140 through MoCA interface 110 for viewing on display device 180. Following viewing of the particular program, MoCA network device 140 may be turned off by the user, placing MoCA network device 140 into a first operational state, referred to as a standby mode. If a signal provided by media content playback device 170 to MoCA network device 140, MoCA network device 140 enters into a second operational state, identified as pass through mode. In pass through mode, the signal from media content playback device is connected between the media content playback device 170 and display device 180 by passing through circuitry in MoCA network device 140.

If no signal is detected from the media content playback device 170 after a predetermined time, the MoCA network device 140 may enter a third operational state, identified as a lower power standby, deep standby, or deep off mode. Alternatively, MoCA network device 140 may be placed into the second operational state, or pass-through mode, for a predetermined period of time after the user turns the device off. As a result, the power consumption operation of MoCA network device 140 may be improved while improving the operational efficiency for the user. Further details related to the operation of the power consumption modes will be described below. Other embodiments related to the sharing and distribution of media content in a home network using more than one physical communication network and power consumption management are also possible.

It should be appreciated by one skilled in the art that system 100 in FIG. 1 is described primarily as operating with a local MoCA network and a second local network, such as an Ethernet network. However, other network standards that incorporate either a wired or wireless physical interface may be used. For instance, the second local network may be a wireless network using WiFi, Bluetooth, or IEEE 802.11. Other wired networks, such as phone line or power line networks, may be used in place of the MoCA network. Further, more than two networks may be used either alternatively or simultaneously together.

Figure 2:
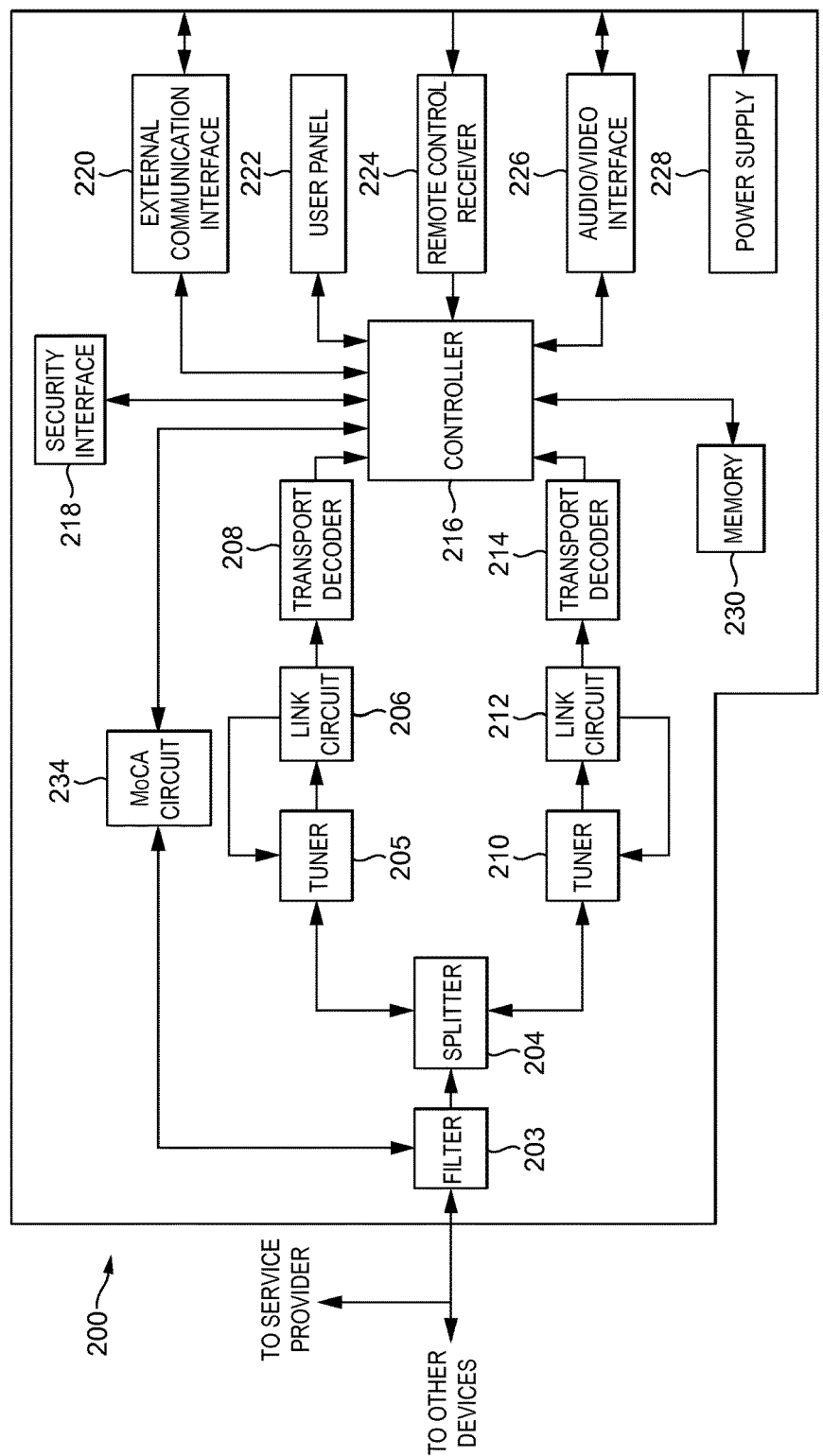
FIG. 2 is a block diagram of an exemplary signal receiving device in accordance with the present disclosure.

Turning now to FIG. 2, a block diagram of an exemplary embodiment of a signal receiving device 200 using aspects of the present invention is shown. Signal receiving device 200 operates in a manner similar to external network receiving device 120 and external network receiving device 130 described in FIG. 1. Signal receiving device 200 primarily receives signals from a cable network service provider and is often described as a home media center, home gateway, or media distribution center. The signals are provided by the service provider and represent broadcast audio and video programs and content and also may include data signals interfaced to the Internet. It is important to note that one or more components may be integrated with a display device, such as a television or display monitor (not shown). In either case, several components and interconnections necessary for complete operation of signal receiving device 200 are not shown in the interest of conciseness, as the components not shown are well known to those skilled in the art.

A signal, either from an external network (e.g., the cable network) or an internal or home network (e.g., MoCA network), is interfaced to signal receiving device 200 at filter 203. Filter 203 connects to splitter 204. Splitter 204 connects to two signal processing paths. A first path includes tuner 205, link circuit 206, and transport decoder 208 connected together serially. A second path includes tuner 210, link circuit 212, and transport decoder 214 connected together serially. The outputs of transport decoder 208 and transport decoder 214 each connect to controller 216. Controller 216 connects to security interface 218, external communication interface 220, user panel 222, remote control receiver 224, audio/video interface 226, power supply 228, and memory 230. External communication interface 220, remote control receiver 224, audio/video output 226, and power supply 228 provide external interfaces for the set top box 200. Filter 203 also connects to MoCA circuit 234. MoCA circuit 234 further connects to controller 216.

One or more cable signal streams, each containing a plurality of channels, and a home network signal, such as MoCA network signal, are received through a radio frequency (RF) co-axial cable at filter 203. In a preferred embodiment, a set of approximately 125 channels are received from the cable network in a frequency range from 50 megahertz (MHz) to 800 MHz. Filter 203 includes a separate high pass filter and low pass filter such that the frequency pass bands of each do not overlap. The arrangement, often referred to as a diplexer, allows for a separation, through signal filtering, of the incoming cable signal from the MoCA signal. In a preferred embodiment, the low pass filter frequency response pass band ends at a frequency below 900 MHz. The low pass filter allows a cable signal in a frequency range from 50 MHz to 800 MHz to pass through to subsequent blocks while attenuating, or not passing through, a MoCA signal in a frequency range from 950 MHz to 1, 200 MHz. The high pass filter portion operates in an opposite manner passing the MoCA signal through and attenuating the cable signal.

The output signal from the low pass filter portion of filter 203 is provided to splitter 204. Splitter 204 splits, or divides, the incoming converted signal stream into two separate signal streams. Splitter 204 operates on the converted signal streams at radio frequencies and divides, or splits, the signal power that is present at the input of splitter 204. Splitter 204 also maintains proper input and output operating impedances across the entire range of operating frequencies. In one embodiment, splitter 204 splits the converted signal stream into two signal streams having between three decibels (dB) and five dB of signal insertion loss and having an operating impedance of 75 ohms at the input and both outputs.

Each of the separate split signal streams from splitter 204 is processed in a separate signal processing path. The upper signal path contains a tuner 205, a link circuit 206, and a transport decoder 208 with the signal path connected in a serial fashion. The lower path also contains a tuner 210, a link circuit 212, and a transport decoder 214 with the signal path also connected in a serial fashion. Each processing path may perform essentially identical signal processing on one of the split signal streams. Therefore only the upper signal processing path will be further described here.

The upper split signal stream from splitter 204 is provided to tuner 205. Tuner 205 processes the split signal stream by selecting or tuning one of the channels in the split signal stream to produce one or more baseband signals. Tuner 205 contains circuits (e.g., amplifiers, filters, mixers, and oscillators) for amplifying, filtering and frequency converting the split signal stream. Tuner 205 typically is controlled or adjusted by link circuit 206. Alternately, tuner 205 may be controlled by another circuit element, such as controller 216, which will be described later. The control commands include commands for changing the frequency of an oscillator used with a mixer in tuner 205 to perform the frequency conversion.

Typically the baseband signals at the output of tuner 205 may collectively be referred to as the desired received signal and represent one satellite channel selected out of a group of channels that were received as the input signal stream. Although the signal is described as a baseband signal, this signal may actually be positioned at a frequency that is only near to baseband.

The one or more baseband signals from tuner 205 are provided to link circuit 206. Link circuit 206 typically contains the processing circuits needed to convert the one or more baseband signals into a digital signal for demodulation by the remaining circuitry of link circuit 206. In one embodiment the digital signal may represent a digital version of the one or more baseband signals. In another embodiment the digital signal may represent the vector form of the one or more baseband signals. Link circuit 206 also demodulates and performs error correction on the digital signal to produce a transport signal. The transport signal may represent a data stream for one program, often referred to as a single program transport streams (SPTS), or it may represent multiple program streams multiplexed together, referred to as a multiple program transport stream (MPTS).

The transport signal is provided to transport decoder 208. Transport decoder 208 typically separates the transport signal, which is provided as either a SPTS or MPTS, into individual program streams and control signals. Transport decoder 208 also decodes the program streams, and creates audio and video signals from these decoded program streams. In one embodiment, transport decoder 208 is directed by user inputs or through a controller such as controller 216 to decode only the one program stream that has been selected by a user and create only one audio and video signal corresponding to this one decoded program stream. In another embodiment, transport decoder 208 may be directed to decode all of the available program streams and then create one or more audio and video signals depending on user request.

The audio and video signals, along with any necessary control signals, from both transport decoder 208 and transport decoder 214 are provided to controller 216. Controller 216 manages the routing and interfacing of the audio, video, and control signals and, further, controls various functions within set top box 200. For example, the audio and video signals from transport decoder 208 may be routed through controller 216 to an audio/video (A/V) interface 226. A/V interface 226 supplies the audio and video signals from signal receiving device 200 for use by external devices (e.g., display device 180 described in FIG. 1). In one embodiment, A/V interface 226 includes an interface for HDMI connections. In another embodiment, the audio/video interface 226 includes input circuitry for receiving signals from external sources (e.g., media content playback device 170 described in FIG. 1). In yet another embodiment, signal receiving device 200 may include the capability to route the signal from an external device back to an external display device using A/V interface 226.

Also, the audio and video signals from transport decoder 214 may be routed through controller 216 to memory block 230 for recording and storage. Memory block 230 may contain several forms of memory including one or more large capacity integrated electronic memories, such as static random access memory (SRAM), dynamic RAM (DRAM), or hard storage media, such as a hard disk drive or an interchangeable optical disk storage system (e.g., compact disk drive or digital video disk drive). Memory block 230 may include a memory section for storage of instructions and data used by controller 216 as well as a memory section for audio and video signal storage. Controller 216 may also allow storage of signals in memory block 230 in an alternate form (e.g., an MPTS or SPTS from transport decoder 208 or transport decoder 214).

Controller 216 is also connected to an external communications interface 220. External communication interface 220 may provide signals for establishing billing and use of the service provider content. External communications interface 220 may include a phone modem for providing phone connection to a service provider. External communications interface 220 also includes an interface for connection to an additional local network (e.g., Ethernet network). The local network may be used for communication data, audio, and/or video signals and content to and from other devices connected to the Ethernet network (e.g., other media devices in a home).

Controller 216 also connects to a security interface 218 for communicating signals that manage and authorize use of the audio/video signals and for preventing unauthorized use. Security interface 218 may include a removable security device, such as a smart card. User control is accomplished through user panel 222, for providing a direct input of user commands to control the set top box and remote control receiver 224, for receiving commands from an external remote control device. User panel 222 may include a plurality of indicator lights for displaying the status of the functions and operations performed by signal receiving device 200. In one embodiment, user panel 222 may include an indicator for recording, network status, display resolution, and power.

Although not shown, controller 216 may also connect to the tuners 205, 210, link circuits 206, 212, and transport decoders 208, 214 to provide initialization and set-up information in addition to passing control information between the blocks. Finally, power supply 228 typically connects to all of the blocks in signal receiving device 200 and supplies the power to those blocks.

MoCA circuit 234 amplifies and processes the MoCA signal both for reception and transmission. As described above, the MoCA interface permits communications of audio and video signals in a home network and may operate bi-directionally. MoCA circuit 234 includes a low noise amplifier for improving reception performance of a MoCA signal received by signal receiving device 200 from another network connected device. The received and amplified signal is tuned, demodulated, and decoded. The decoded signal may be provided to a number of other circuits, including audio and video outputs as well as a mass storage device (e.g., hard disk drive, optical drive, and the like), not shown. Additionally, MoCA circuit 234 generates and formats the MoCA transmit signal using audio and video content available in signal receiving device, including content received from the input (e.g., cable signal) and content from the mass storage device. MoCA circuit 234 also includes a power amplifier for increasing the transmitted signal level of the MoCA signal sent by signal receiving device 200 to another network connected device. Adjustment of the receive signal amplification as well as the transmit signal amplification in MoCA circuit 234 may be controlled by controller 216.

It should be appreciated by one skilled in the art that the blocks described inside signal receiving device 200 have important interrelations, and some blocks may be combined and/or rearranged and still provide the same basic overall functionality. For example, transport decoder 208 and transport decoder 214 may be combined and further integrated along with some or all of the functions of controller 216 into a System on a Chip (SoC) that operates as the main controller for signal receiving device 200. Further, control of various functions may be distributed or allocated based on specific design applications and requirements. As an example, the processing paths for the two input signal streams may operate for specific types of signals. Tuner 205, link circuit 206, and transport decoder 208 may receive, demodulate, and decode satellite signals containing content in high definition audio and video formats while tuner 210, link circuit 212, and transport decoder 214 may receive, demodulate, and decode signals containing data for maintaining the operation of a program guide.

Figure 3:
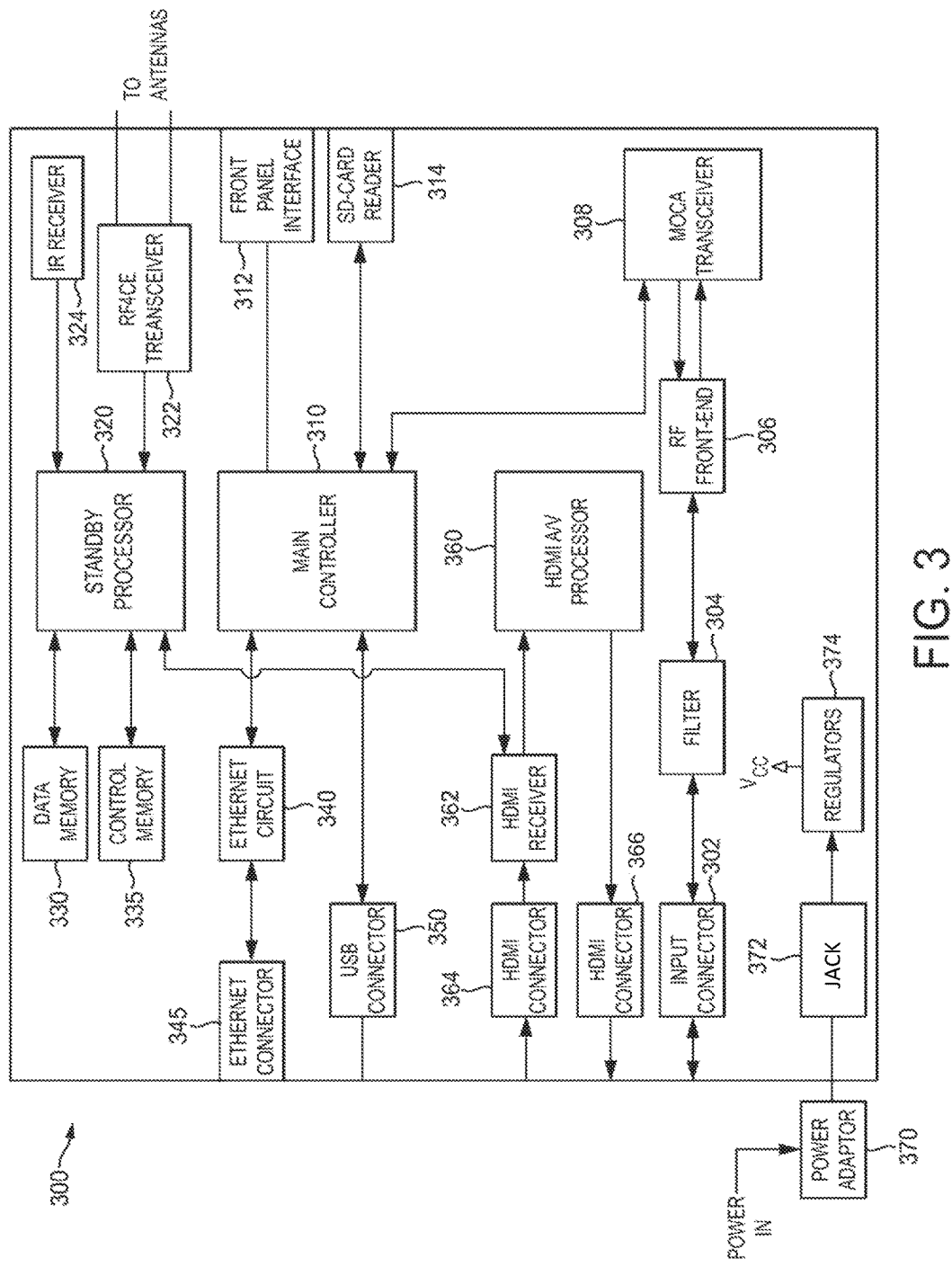
FIG. 3 is a block diagram of an exemplary network device in accordance with the present disclosure.

Turning now to FIG. 3, a block diagram of an exemplary embodiment of a network device 300 using aspects of the present invention is shown. Network device 300 operates in a manner similar to MoCA network device 140 described in FIG. 1. Part or all of network device 300 may be included as part of a larger home entertainment device, such as External network device 120 or 130 described in FIG. 1. Network device 300 primarily receives signals from a central gateway device in a home distribution network and is often described as a thin client set top box, a remote receiver, or a client device. The signals are provided over a home network, such as a MoCA network or other wired or wireless network. It is important to note that one or more components may be integrated with a display device, such as a television or display monitor (not shown). In either case, several components and interconnections necessary for complete operation of signal receiving device 300 are not shown in the interest of conciseness, as the components not shown are well known to those skilled in the art.

A signal, distributed as part of a home or local network (e.g., a MoCA network), is interfaced through connector 302. Connector 302 is connected to filter 304. Filter 304 is connected to RF Front End 306. RF Front end 306 is connected to MoCA transceiver 308. MoCA transceiver 308 is connected to main controller 310. Main controller 310 is also connected to front panel interface 312, secure digital (SD) card reader 314, standby processor 320, Ethernet circuit 340, universal serial bus (USB) interface, and HDMI A/V processor 360. Ethernet circuit 340 is connected to Ethernet connector 345. Standby processor 320 is further connected to radio frequency for consumer electronics (RF4CE) transceiver 322, infra-red (IR) IR receiver 324, data memory 330, control memory 335, and HDMI receiver 362. RF4CE transceiver 322 is further connected to antennas (not shown). HDMI A/V processor is further connected to HDMI receiver 362 and HDMI connector 366. HDMI receiver 362 is further connected to HDMI connector 364. Electrical power is provided to power adaptor 370. Power adaptor 370 connects to jack 372. Jack 372 connects regulators 374. Regulators 374 provide electrical power signals, labeled Vcc, to elements in signal receiving device 300. The connections for Vcc are not shown.

The MoCA signal, containing audio, video, and/or data program content is received through a cable (e.g., a coaxial cable) from a central distribution unit (e.g., signal receiving device 200 described in FIG. 2 or external network receiving device 120 or 130 described in FIG. 1) at connector 302 and passed through filter 304. Filter 304 passes the MoCA signal through while attenuating other signals present on the cable. Filter 304 also filters any undesired signals transmitted from RF front end 306. RF front end 306 includes tuners and amplifiers used for receiving the MoCA signal as well as transmitting a MoCA signal from signal receiving device 300 to the home network. The tuned input signal from RF front end 306 is provided to MoCA transceiver 308. MoCA transceiver 308 demodulates the tuned input signal and provides audio, video, and/or data program content signals to main controller 310.

The main controller 310 is also interconnected to several of the components in network device 300, including standby processor 320, HDMI A/V processor 360, SD card reader 314, Ethernet circuit 340, and front panel interface 312. The main controller 310 manages and controls the conversion process and routing for converting signals between the various communication network interfaces. Main controller 310 converts the signal received from the MoCA network through MoCA transceiver 308, in a serial Ethernet or reduced gigabit media independent interface format, and may provide the converted signal to the Ethernet network through Ethernet circuit 340. Main controller 310 may similarly provide the signal to a display device through HDMI A/V processor 360. Main controller 310 also provides the signal to a computer network or device through USB connector 350. Similarly, main controller 310 may receive and converts inputs from one or more of the above communication networks and provide the signal to MoCA transceiver 308 or to any other communication network through an interface.

Ethernet circuit 340 transfers data to and from the device onto a local network through Ethernet connector 345. The local network may be used for communication data, audio, and/or video signals and content to and from other devices connected to the local network (e.g., other media devices in a home). Ethernet connector may be a typical Registered Jack type RJ-45 physical interface connector or other standard interface connector and allow connection to an external local computer.

SD card reader 314 supports connection of additional external storage and may allow transfer of external information (e.g., pictures, video files, audio files and the like) with the main controller 310.

User control and display status may be accomplished through front panel interface 312. Front panel interface 312 provides a direct input of user commands to control the device. Front panel interface 312 may also include a plurality of indicator lights for displaying the status of the functions and operations performed by the device. In one embodiment, front panel interface 312 may include a power button and an indicator for recording, network status, display resolution, and power.

Standby processor 320 is operative to receive and process user input signals provided via inputs from RF4CE transceiver 322 and/or IR receiver 324. The input signals are generated by a remote control device operated by the user and including, but not limited to, an IR remote control, RF remote control, gesture based controller, or touchpad device.

RF4CE transceiver 322 may operate as either a unidirectional or bidirectional communication interface to an RF remote control. In the preferred embodiment, the interface is unidirectional receiving user control commands from the remote control device. RF4CE transceiver 322 is also shown connecting to two antennas in a diversity antenna arrangement to improve reception. In other embodiments, more or fewer antennas may be used. IR receiver 324 similar operates as receiver interface to an IR remote control device. IR receiver 324 similarly receives user control commands from the remote control device. In some cases, the same remote control device may include both IR and RF transmitting circuits. Standby processor 320 may include a process for determining from which input (i.e., RF4CE transceiver 322 or IR receiver 324) to accept a signal.

The standby processor is further coupled to both a data memory 330 and a control memory 335. Data memory 330 may be used to store temporary information, such as program guide information or portions of media content, used by device 300. Data memory 330 may also store a database of elements, such as graphic elements containing content. The database may be stored as a pattern of graphic elements. Alternatively, the memory may store the graphic elements in identified or grouped memory locations and use an access or location table to identify the memory locations for the various portions of information related to the graphic elements. Control memory 335 may be used for storing operational code used by standby processor 320 as well as main controller 310 and HDMI A/V processor 360.

Electrical power is provided to network device 300 through external power adaptor 370 connected to a home mains power source (e.g., 110 volts). Power adaptor 370 converts the mains power to one or more lower power signals (e.g., 12 volts) and provides the signal(s) to regulators 374 through power jack 372. Regulators 374 supply individual power supply signals to the various elements in network device 300.

Standby processor 320 may also include circuitry and processing for power management that operates in conjunction with regulators 374 as well as one or more of the other elements in network device 300. In one embodiments, one or more circuits in regulators 374 are controlled to power on and power off through a control signal (not shown) from standby processor 320. Additionally, Main controller 310 and HDMI A/V processor along with HDMI receiver 362 include an input for a power down power enable signal that is separate from the input Vcc signal. This power down or power enable signal may be provided by standby processor 320 or from another element in network device 300 in conjunction with standby processor 320 and/or regulators 374. The power management and control function in standby processor 320 may be used to implement one or more standby modes in network device 300. Additional detail on the one or more standby modes will be further described below.

Data memory 330 and control memory 335 may use any known memory technology (e.g., volatile or non-volatile memory, including RAM, SRAM, DRAM, ROM, programmable ROM (PROM), flash memory, electronically programmable ROM (EPROM), electronically erasable programmable ROM (EEPROM), etc.) Further, the implementation of the data memory 330 and control memory 335 may include several possible embodiments, such as a single memory device or, alternatively, more than one memory circuit communicatively connected or coupled together to form a shared or common memory.

HDMI input signals at HDMI connector 364 are provided to HDMI receiver 362. HDMI receiver 362 provides synchronization and timing control for the input signal as well as any signal format conversion. In one embodiment, HDMI receiver 362 converts the HDMI signal to a Consultative Committee for International Radio (CCIR) standard 656 format video signal along with a separate audio signal. HDMI receiver 362 also includes one or more input signal detection circuits. The detection circuit may include circuitry that uses one or more monitoring functions. In a preferred embodiment, the presence of an additional control signal in the HDMI signal, such as the consumer electronics communication (CEC) interface signal may be monitored or detected. This signal is generated by the source device (e.g., CD or DVD player) and requires very little additional power to monitor. In other embodiments, other communications may be monitored, such as inter-integrated circuit (IIC) communication. In still other embodiments, a direct power level detection with a threshold level for either the audio and/or video signal may be used. Further, in some embodiments, one or more of the detection mechanisms may set or reset a register value or a bit in a register in HDMI receiver 362. In other embodiments, the detection mechanism may trigger an interrupt signal in HDMI receiver 362 that may be sent to either HDMI A/V processor 360 or to standby processor 320. In still other embodiments, standby processor 320 may poll HDMI receiver 362 to monitor the detection mechanism, either directly or by reading the register or the interrupt signal.

The processed signal from HDMI receiver is provided to HDMI A/V processor 360. HDMI A/V processor 360 may further separate the audio and video portions of the signal as necessary. HDMI A/V processor 360 may also provide any further signal conversion, including any format conversion necessary for display on an external device. HDMI A/V processor 360 further routes signals to main controller 310 when the signal provided through the HDMI input are requested to a different communication network. HDMI A/V processor 360 also routes signals (e.g., signals provided through HDMI receiver 362 or signals routed from main controller 310) as HDMI outputs signals through HDMI connector 366.

It should be appreciated by one skilled in the art that the blocks described inside network device 300 have important interrelations, and some blocks may be combined and/or rearranged and still provide the same basic overall functionality. For example, main controller 310 and standby processor 320 may be combined and further integrated along with some or all of the functions of and HDMI A/V processor 360 into a System on a Chip (SoC) that operates as the main controller for network device 300.

In operation, standby processor monitors IR receiver and RF4CE transceiver for user inputs. The power button on front panel interface 312 may also be monitored as user input. The user input is monitored to determine a state change for network device 300 from either a standby mode to an on mode or from an on mode to a standby mode. If the signal receiving device 300 is in active standby mode, HDMI receiver 362 also monitors for the presence of a video signal through HDMI connector 364. If a video signal is present, HDMI receiver 362 provides a notification signal to HDMI A/V processor 360 to power up and to begin processing the audio and video signal and provide the signals back to HDMI connector 364. In this manner, operates in pass through standby mode. It is important to note in active standby mode, only standby processor 320, RF4CE transceiver 322, IR receiver 324, and HDMI receiver 362 may be powered on. In pass through standby mode, these elements plus HDMI A/V receiver 360 may be powered on. Finally, if it is determined that no signal is present at the HDMI receiver 362, network device 300 may enter a deep standby mode. In this mode, HDMI receiver 362 is powered down.

It should be noted that other operating conditions and configurations for the various standby modes in network device 300. In an alternate embodiment, HDMI receiver 362 may determine the presence of an input signal at HDMI connector 364. Standby processor 320 may periodically (e.g., once every five seconds) interrogate HDMI receiver 362 to determine a signal reception condition. If the signal reception condition is true, then standby processor 320 directs HDMI A/V processor 360 to power on, in pass through mode, and process the received signal (either directly or through main controller 310 operating in an alternate low power operating mode) to provide the signal to HDMI connector 366.

Figure 4B:
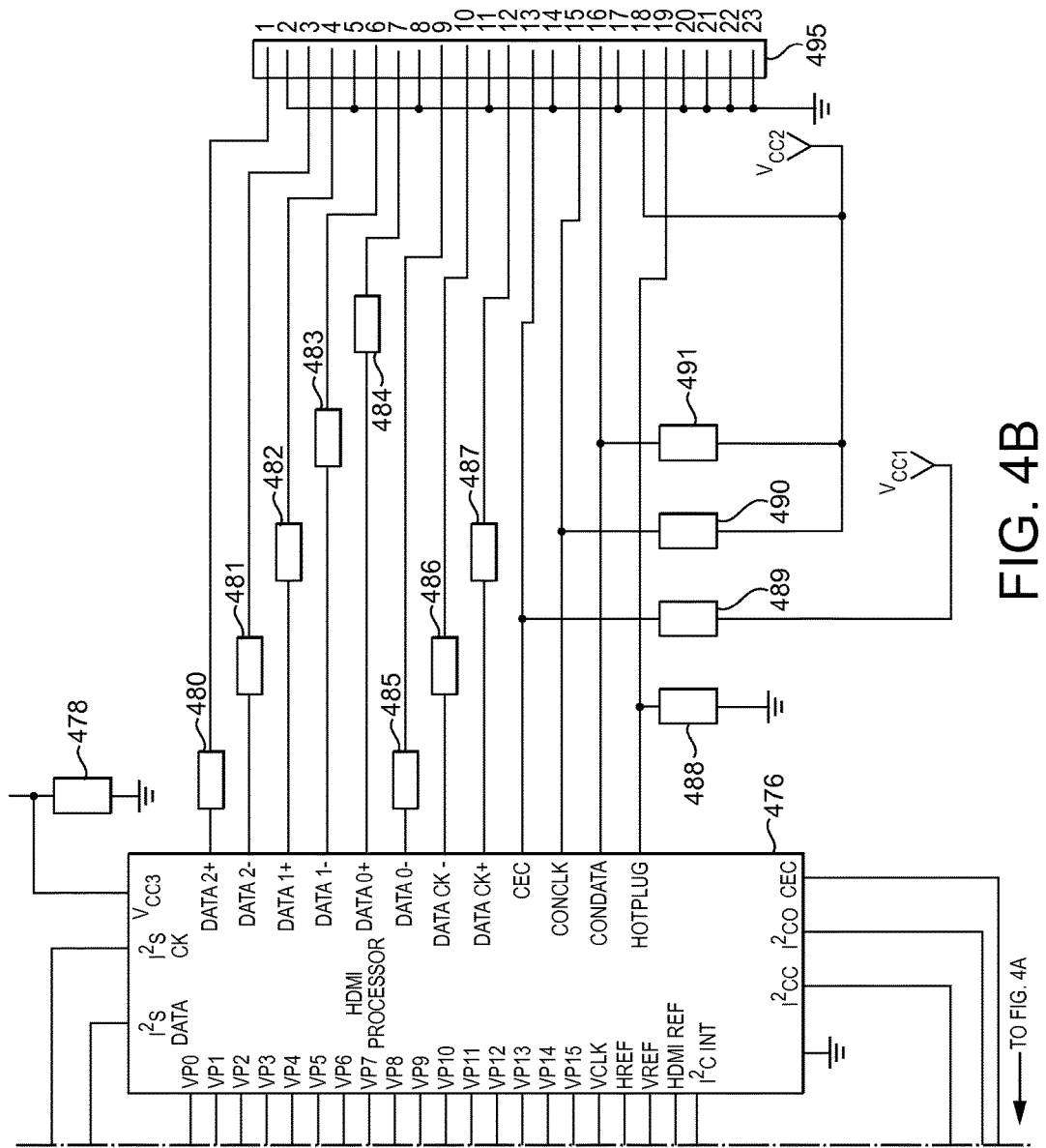

Turning to FIG. 4A and FIG. 4B, an exemplary embodiment of an audio/video connection circuit 400 used in a device according to aspects of the present disclosure is shown. Connection circuit 400 may be included in a network device, such as network device 300 described in FIG. 3. Connection circuit 400 may also be used in a signal receiving device, such as signal receiving device 200 described in FIG. 2. Connection circuit 400 may also be used in other devices, such as external network receiving device 120, external network receiving device 130, MoCA network device 140 or local network device 160 described in FIG. 1. Several components and interconnections necessary for complete operation of connection circuit 400 are not shown in the interest of conciseness, as the components not shown are well known to those skilled in the art.

Connection circuit 400 includes a connector 410 that is used for inputting signals (e.g., HDMI signals). Terminals 1, 3, 4, 6, 7, 9, 10, 12, 15, 16, 18, and 19 on connector 410 connect to HDMI receiver 420 directly. Terminal 13 connects through element 424 to HDMI receiver 420 and also through element 426 to HDMI processor 476. Terminals 2, 5, 6, 11, 17, and 20-23 on connector 410 connect to ground. Terminal 14 remains not connected. An input from a standby circuit, such as standby processor 320 described in FIG. 3, also connects to HDMI receiver 420. HDMI receiver 420 connects to HDMI processor 476 using several connections directly or through elements 432 to 472. HDMI receiver 420 also connects to a terminal labeled Vcc1. Vcc1 connects to ground through element 422. HDMI receiver 420 also includes two terminals connected through element 428 with one terminal further connected to ground through element 430.

HDMI processor 476 connects to Vcc1 at the terminal point with element 472 and through element 474. HDMI processor 476 connects to a terminal labeled Vcc3 and also connects to ground. Vcc3 further connects to ground through element 478. HDMI processor 476 connects to terminals 1, 3, 4, 6, 7, 9, 10, and 12 on connector 495, through elements 480 to 487. HDMI processor 476 also connects directly to terminals 13, 15, 16, and 19 on connector 495. The connection between HDMI processor 476 and terminal 19 on connector 495 also connects to ground through element 488. The connection between HDMI processor 476 and terminal 13 on connector 495 further connects to Vcc1 through element 489. The connections between HDMI processor 476 and terminals 15 and 16 on connector 495 also connect to a terminal labeled Vcc2 through elements 490 and 491 respectively. Terminal 18 on connector 495 also connects directly to Vcc2. Terminal 14 on connector 495 remains not connected. Finally, terminals 2, 5, 8, 11, 17, and 20-23 on connector 495 connect to ground.

In one embodiment, connector 410 and connector 495 are used for interfacing HDMI signals. The HDMI interface uses three differential data signals for transmitting audio and video signals, labeled Data2+, Data2−, Data1+, Data1−, Data0+, and Data0− on both. A differential clock signal, labeled Dataclk+ and Dataclk− on both HDMI receiver 420 and HDMI processor 476, provides a clock signal for the data. Several data formats for the audio and video signals are provided. In the preferred embodiment, the three data signals carry a luminance and a chroma blue and chroma red (YCrCb) color component set. Audio signals may also be multiplexed with one or more of the three differential data signals.

In addition, a CEC signal is provided, along with auxiliary data and clock signals (labeled CONCLK and CONDATA), an external Vcc2 signal, and a hot plug signal. The CEC signal is also provided to HDMI processor 476, particularly for use in signal pass through operation. HDMI receiver 420 also includes an internal clock source, labeled XTALIN and XTALOUT, that is used to synchronize to the received HDMI signal and to generate a clock signal for audio and video signals provided from HDMI receiver 420.

HDMI receiver 420 converts the HDMI signal (e.g., audio and/or video signal) into a format that may be used by other components in a device. In the present embodiment, HDMI receiver 420 converts the HDMI signal to a CCIR 656 video signal and an inter integrated circuit sound (IIS or $I^2S$) signal. The CCIR 656 signal is a multiplexed 16 bit parallel video signal labeled VP0 to VP15 on both HDMI receiver 420 and HDMI processor 476. The multiplexed video signal consists of the YCrCb color component set on alternating clock cycles. CCIR 656 also includes a clock signal, labeled Vclk on both HDMI receiver 420 and HDMI processor 476, as well as a horizontal and vertical display synchronization signal, labeled Href and Vref. The $I^2S$ audio signal includes a data and clock signal, labeled $I^2$SData and $I^2$SCK on both HDMI receiver 420 and HDMI processor 476.

An additional HDMI reference signal is provided between HDMI receiver 420 and HDMI processor 476 to permit resynchronization of the converted signal as a HDMI signal in HDMI processor 476. Data communications between HDMI receiver 420 and HDMI processor 476 may be handled through $I^2C$ clock and data, labeled $I^2$CC and $I^2$CD respectively. An interrupt signal, label INT on HDMI receiver 420, is provided to the $I^2C$ interrupt input, labeled $I^2$CINT, on HDMI receiver 476.

HDMI processor 476 includes a similar HDMI signal interface for providing an HDMI signal to connector 495 as described above for HDMI receiver 420 and connector 410.

The arrangement of elements described here represents a preferred embodiment for connection circuit 400. Table 1 shows an exemplary set of element values for the preferred embodiment.

TABLE 1

| ELEMENT | VALUE |
|---------|-------|
| 422 | 1000 picoFarad |
| 424 | 50 ohms |
| 426 | 50 ohms |
| 428 | 27 MHz Crystal |
| 430 | 22 picoFarad |
| 432-470 | 22 ohms |
| 472 | 22 ohms |
| 474 | 10,000 ohms |
| 478 | 1000 picoFarad |
| 480-487 | 22 ohms |
| 488 | 10,000 ohms |
| 489 | 27,000 ohms |
| 490 | 2,200 ohms |
| 491 | 2,200 ohms |

In operation, an HDMI signal received through connector 410 is processed in HDMI receiver 420 and provided to HDMI processor 476 as a CCIR 656 video signal and $I^2S$ audio signal. The HDMI processor 476 may provide these signals to other processing blocks in a device (e.g., main controller 310 in FIG. 3) or may convert the signals back to HDMI signals and provide the signals to connector 495.

In a first standby mode, referred to as active standby mode, HDMI processor 476 is powered down or held in a power reset state and HDMI receiver monitors the CEC or Vcc2 input for the presence of an HDMI input signal. It is important to note that other detection methods may be possible, including detection signal energy on one or more data lines, the presence of a hot plug signal, or presence of communications through CONCLK and CONDATA.

If a CEC or Vcc2 input is detected, HDMI receiver 420 may begin processing the HDMI signal and also send an interrupt signal to HDMI processor 476 through $I^2$CINT to power up or exit the power reset state. Communication and data signal passing begins between HDMI receiver 420 and HDMI processor 476 in a second standby mode, referred to as signal pass through mode. The interrupt signal may also be used to power down or return HDMI processor 476 to a power reset state, as part of the active standby mode, after the presence of the CEC or Vcc2 is removed from the input of HDMI receiver 420.

If the CEC or Vcc2 input is not present for a predefined period of time (e.g., two hours), a signal may be sent through a separate communication to a separate processing element (not shown) in order to place HDMI receiver 420 into a reset/power down mode, as part of a third standby mode, referred to as deep standby mode.

Figure 5:
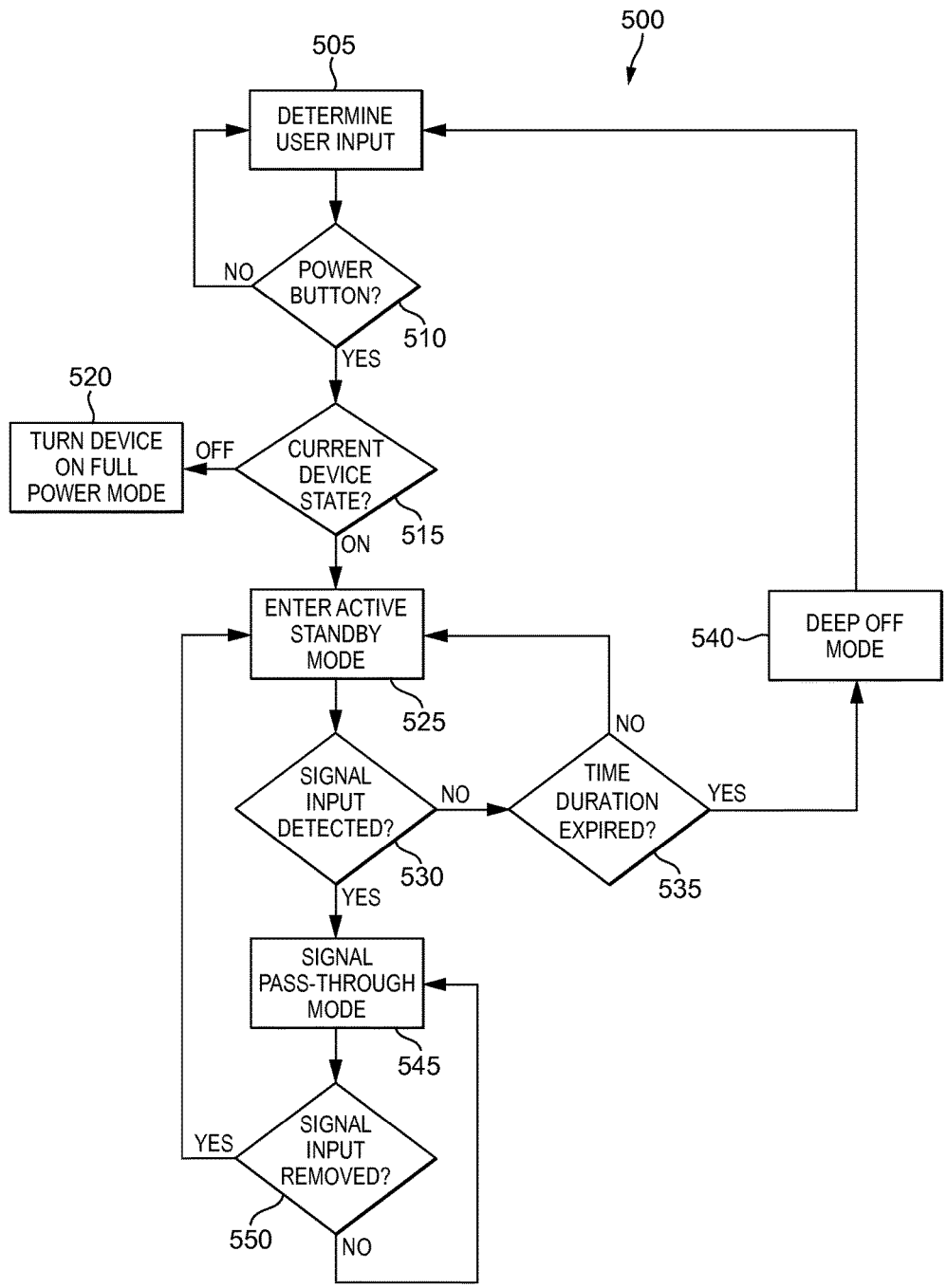
FIG. 5 is a flowchart of an exemplary process for controlling the audio/video connection in a signal receiving device in accordance with the present disclosure.

Turning now to FIG. 5, a flowchart of an exemplary process 500 for controlling the audio/video connection in a signal receiving device in accordance with the present disclosure is shown. Process 500 will primarily be described with respect to network device 300 described in FIG. 3. The steps of process 500 may equally apply to the signal receiving device 200 in FIG. 2 and may also be used in conjunction with audio/video connection circuit 400 described in FIG. 4A and FIG. 4B. Additionally, one or more of the steps in process 500 may be equally applicable to external network receiving device 120, external network receiving device 130, MoCA network device 140 or local network device 160 in FIG. 1. Further, it is important to note that some of the steps described in process 500 may be implemented more than once, or may be implemented recursively. Such modifications may be made without any effect to the overall aspects of process 500.

At step 505, the device is initialized, if necessary, and a user input is determined. Initialization, at step 505, may include establishing any communication links between elements internal and external to the device.

At step 510, a determination is made as to whether the power button has been pressed. The power button may be part of front panel interface 312 or may be a button on an external remote control with the signal transmitted to the device through either the RF4CE transceiver 322 or IR receiver 324. If, at step 510, the power button has not been pressed, process 500 returns to the initialization and determination at step 505. If, at step 510, the determination is made that the power button has been pressed, then at step 515, a determination is made regarding the current state of the device.

If, at step 515, the device is determined to in an off state (e.g., one of the standby modes), then, at step 520, the device is turned on. It is important to note that the device may have more than one standby mode including a standby mode specifically for passing an HDMI signal through the device. If, at step 515, the device is determined to in full power or powered on state, then, at step 525, the device is placed into a first standby mode. The first standby mode, at step 525, may be referred to as an active standby mode. This first standby mode may power off elements in the device while maintaining power to HDMI receiver 362 as well as other communications elements, such as standby processor 320, RF4CE transceiver 322 and IR receiver 324.

Also, at step, 525, a standby mode timer may be started. The standby mode timer, at step 525, may be one of several timers used in controlling state switching between standby modes. In particular, the standby mode timer, at step 525, determines the timing for switching between a first standby mode and second standby mode based on inactivity during the first standby mode. In a preferred embodiment, the timer period is 3 hours, however other timer periods may be used. The timer functions may be maintained and controlled in standby processor 320 or in HDMI receiver 362.

At step 530, a determination is made as to whether an input signal is detected at the HDMI input of the device. If, at step 530, no input signal is detected, then, at step 535, a determination is made as to whether the specified or predetermined time period has been exceeded based on the first standby timer started, at step 525 and again progressed to step 530. If, at step 535, the specified time period has not been exceeded, then process 500 returns to step 525. If, at step 535, the time period has been exceeded, then, at step 540, the device is placed into a second standby mode, referred to as deep off mode. Deep off mode, at step 540, operates only minimum circuits necessary for user interaction (e.g., standby processor 320, RF4CE transceiver 322 and IR receiver 324) and powers off the HDMI receiver 362. Deep off mode, at step 304, may also include changing the clock rate on the remaining powered on elements to a lower clock rate. Process 500 then returns to step 505 and waits for an initialization.

If, at step 530, a signal is detected at the HDMI input, then, at step 545, the device is placed into a third standby mode, referred to as HDMI pass through mode. HDMI pass through mode, at step 545, powers any additional circuitry to the circuitry powered in active standby mode that is necessary to allow a signal received at HDMI connector 364 to pass to HDMI connector 366. In one embodiment, HDMI A/V processor 360 is powered on in addition to the other circuitry already described earlier.

The signal detection, at step 530, may be accomplished through one or more monitoring functions. In a preferred embodiment, an additional control signal in the HDMI signal, such as the consumer electronics communication (CEC) interface signal may be used. This signal is generated by the source device (e.g., CD or DVD player) and requires very little additional power to monitor. The signal is provided as an interrupt signal at the output of HDMI receiver 362 and is provided to either standby processor 320 or to HDMI A/V processor 360. In other embodiments, other communications may be monitored, such as inter-integrated circuit (IIC) communication. The presence of the communication may set or reset a register value or a bit in a register in HDMI receiver 362. The register may be read on a periodic basis by standby processor 320. In still other embodiments, a direct power level detection with a threshold level for either the audio and/or video signal may be used.

Next, at step 550, a determination is made as to whether the input signal is still present at the HDMI receiver 362. If, at step 550, the HDMI input signal is still present, then, process 500 returns to step 545 to remain in pass through mode, and progresses back to step 550. If, at step 550, the determination is made that the HDMI signal has been removed or the time period has been exceeded, then process 500 returns to step 525 and the device is placed into active standby mode, progressing again to step 530.

The determination, at step 550, may also include a second standby timer that is used to determine a time period with no signal present. In a preferred embodiment, the time period for the second standby timer is 3 hours but other time periods are possible. If the time period in the second standby timer after the time the input signal is not present has not been exceeded, the process 500 returns to step 545. If the time period in the second standby timer after the time the input signal is not present has been exceeded, the process 500 returns to step 525.

It is important to note that deep off or deep standby mode, at step 540, may also include a third standby timer. The third standby timer may wait a specified time period (e.g., 10 minutes) and then return temporarily to the active standby mode and determine the presence of an input signal, similar to that described at step 530. If no signal is present, device 300 returns to deep off or deep standby mode, at step 540. If an input signal is present, then device enters pass through mode, at step 545. The third standby timer in deep off or deep standby mode allows a temporary return to pass through mode while minimizing additional user interaction with device 300.

Process 500 describes a device that may operate in any of four operating modes. In full power on mode, all functionality in the device is available and all processors and controllers in the device are operable. Specifically, standby processor 320, main controller, 310, and HDMI A/V processor 360, along with all associated circuits, are powered on and operate. In deep off mode, the device is not operational for signal processing but minimum functionality is maintained. Specifically, standby processor 320 may maintain the ability to receive inputs through RF4CE transceiver 322 and IR receiver 322. If necessary, data memory and/or control memory 335 may remain powered. Also, any functionality related to the power button on the device may be powered on. In active standby mode, the deep off mode functionality is augmented with the ability to determine the presence of an input HDMI signal. Specifically, HDMI receiver 362 may be powered on. In HDMI pass through mode, the active standby mode is further augment with the ability to pass an HDMI signal through the device. Specifically, HDMI A/V processor 360 may be powered on. It is important to note that in some implementations, process 500 may be modified by eliminating the use of the deep off mode and eliminating steps 535 and 540.

Figure 6:
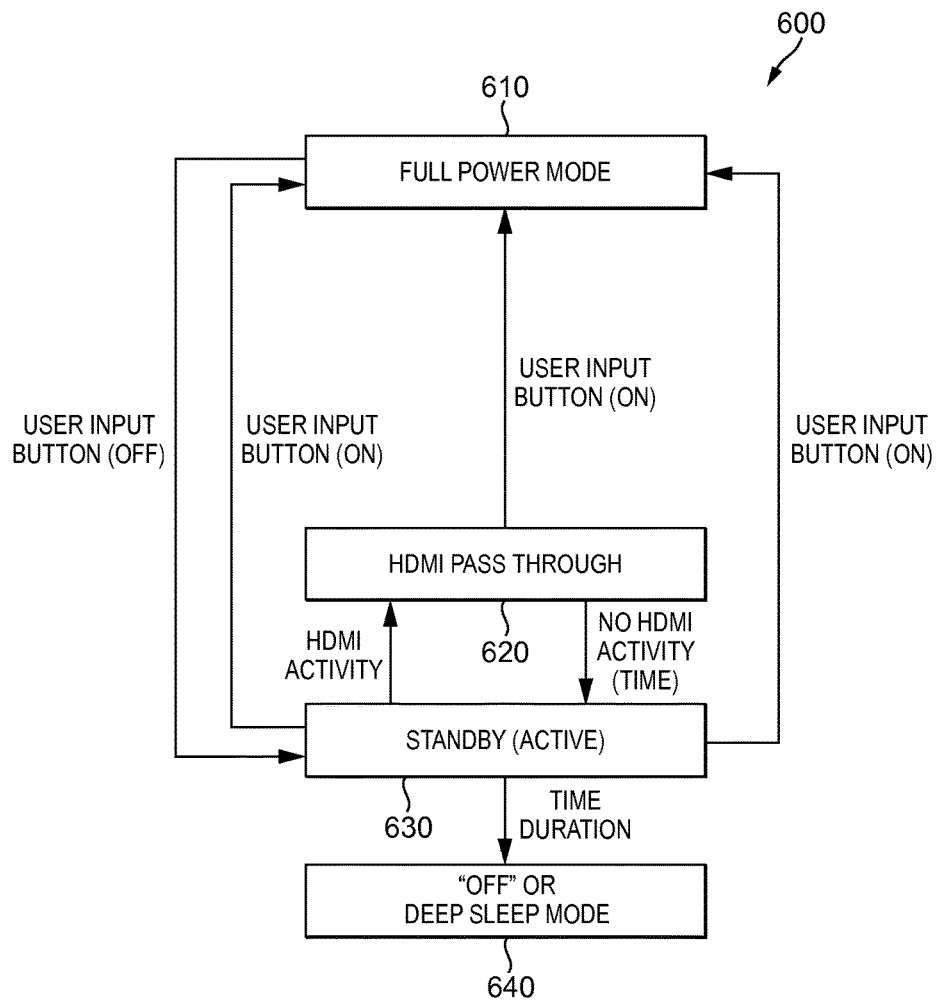
FIG. 6 is a state diagram illustrating exemplary operating states in a signal receiving device in accordance with the present disclosure.

Turning now to FIG. 6, a state diagram 600 illustrating exemplary operating states in a device in accordance with the present disclosure is shown. State diagram 600 will primarily be described with respect to network device 300 described in FIG. 3 and process 500 described in FIG. 5. State diagram 600 may equally apply to the signal receiving device 200 in FIG. 2. Additionally, state diagram 600 may be equally applicable to external network receiving device 120, external network receiving device 130, MoCA network device 140 or local network device 160 in FIG. 1.

State diagram includes four states, 610 to 640, each with progressively lower power consumption by the device. State diagram 600 includes a first state 610. State 610 is a full power on state. From 610, the device may move to state 630, a first or active standby state. The move from state 610 to state 630 may occur as a result of a power down event (e.g., user input from front panel interface 312 or remote control to power off the device). From state 630, the device may move to state 620, a pass through standby mode, after determining presence of an input A/V signal (e.g., HDMI signal). From state 620, the device may return to state 630 when it is determined that an HDMI signal is no longer present (e.g., either immediately after or waiting a specified time period after determination). Also, from state, 630, the device may move to state 640, an off or deep standby mode based on, for example, exceeding a specified time duration with no input signal present.

The device may move from any of states 620, 630, and 640 back to state 610 when a power on event is determined. The power on event may include, but is not limited to, pressing a power button on the device or pressing a power button or other operational button on a remote control used for controlling the device.

The embodiments herein describe an apparatus and method for controlling an audio/video connection in a device. The embodiments identify a device and process that utilize a full power mode as a well as a plurality of alternative standby modes in order to minimize power consumption. More particularly, embodiments describe signal pass-through mode control during standby operation for a device that includes both a local network interface, such as MoCA, and a direct device interface, such as HDMI. A typical device using this mode includes, but is not limited to, a network device, a thin client box, or an intermediate settop box. This type of device contains only features for operating between a main control box (e.g., external network receiving device, gateway, or other content source) and a user display device. The embodiments identify at least two separate standby modes of operation in addition to a full power on mode of operation for the device. When the device is directed to turn off, a lower power standby mode is entered based on a user input. Additionally, A detection circuit that remains powered in the lower power standby mode determines whether a signal is present at the HDMI or other media input to the device and changes the mode from standby to a higher power pass through standby mode in order to pass the signal at the input to the output of the device. Inactivity at the input returns the device to the lower power standby mode. The lower power standby mode may further enter very low power mode, with at least the detection circuit powered off, after a specified time period. As a result, the present disclosure addresses problems related to reducing or minimizing power consumption while implementing a signal pass through operating mode during standby operation in a device.

Although embodiments which incorporate the teachings of the present disclosure have been shown and described in detail herein, those skilled in the art can readily devise many other varied embodiments that still incorporate these teachings. Having described preferred embodiments of a method and apparatus for managing a media content database on a device (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method comprising:
   entering a first operational state in a device in response to a user input, the first operational state powering a portion of circuits in the device;
   detecting presence of a signal received at an input to the device, the received signal to be output from the device for display on a display device;
   entering a second operational state in the device if the presence of the signal is detected, the second operational state powering one or more circuits for outputting the received signal;
   entering a third operational state from the first operational state after not detecting the presence of the signal at the input to the device for a first period of time, the third operational state powering only one or more circuits needed for user input to the device; and
   entering the first operational state from the third operational state, after a second time period and not in response to a user input, for detecting the presence of the signal at the input to the device.

2. The method of claim 1, further comprising:
   determining the presence of the signal received at the input to the device when the device is in the second operational state; and
   returning to the first operational state if it is determined that the signal is no longer present at the input to the device.

3. The method of claim 1, wherein the first operational state is active standby and the second operational state is signal pass through.

4. The method of claim 1, wherein the third operational state is deep standby.

5. The method of claim 1, wherein the signal is a high definition multimedia interface (HDMI) signal.

6. The method of claim 5, wherein the HDMI signal is received from a content source device connected through an HDMI interface to the device.

7. The method of claim 5, wherein the detecting includes detecting the presence of at least one of a consumer electronics communication (CEC) interface signal and the plus five volt power signal in the HDMI signal.

8. The method of claim 7, wherein the CEC interface signal is used to power on an HDMI signal processing circuit in the second operational state.

9. The method of claim 1, wherein the portion of the circuits in the first operational state is a user input circuit and a signal receiver circuit.

10. The method of claim 1, wherein the one or more circuits for outputting the received signal from the device comprising a signal processing circuit.

11. The method of claim 1, further comprising entering a fourth operational state in response to a user input, the fourth operational state entered from one of the first operational state, the second operational, and the third operational state, the fourth operational state powering all circuits in the device.

12. The method of claim 11, wherein the fourth operational state is power on.

13. An apparatus comprising:
   a standby processing circuit, the standby processing circuit being adapted to receive an input from a user, the input for placing the apparatus into a first operational state;
   a signal receiving circuit coupled to the standby processing circuit, the signal receiving circuit being adapted to detect presence of a signal received at the signal receiving circuit in the first operational state, the signal receiving circuit providing a signal to place the apparatus in a second operational state if the presence of the signal is detected; and
   a signal processing circuit coupled to the signal receiving circuit and standby processing circuit, the signal processing circuit being operational in the second operational state but not in the first operational state, the signal processing circuit being adapted to output the signal received in the signal receiving circuit for display on a display device in the second operational state; and wherein the signal receiving circuit and the signal processing circuit are adapted to enter a third operational state from the first operational state after not detecting the presence of the signal at the input to the device for a first period of time, the third operational state powering only one or more circuits needed for user input to the device, and the signal receiving circuit and the signal processing circuit are adapted to enter the first operational state from the third operational state after a second time period and not in response to a user input.

14. The apparatus of claim 13, wherein the signal receiving circuit is also adapted to determine the presence of the signal received at the input when in the second operational state, and wherein the standby processing circuit is adapted to place the apparatus in the first operational state if the signal receiving circuit determines that the signal is no longer present at the input.

15. The apparatus of claim 13, wherein the first operational state is active standby and the second operational state is signal pass through.

16. The apparatus of claim 13, wherein the third operational state is deep standby.

17. The apparatus of claim 13, wherein the signal is a high definition multimedia interface (HDMI) signal.

18. The apparatus of claim 17, wherein the HDMI signal is received from a content source device connected through an HDMI interface to the apparatus.

19. The apparatus of claim 17, wherein the signal receiving circuit is adapted to detect the presence of at least one of a consumer electronics communication (CEC) interface signal and a plus five volt supply signal in the HDMI signal.

20. The apparatus of claim 19, wherein the CEC interface signal is used to power on an HDMI signal processing circuit in the second operational state.

21. The apparatus of claim 13, further comprising a user input circuit, the user input circuit for receiving an input from a user, the user input circuit also adapted to be operational in the first operational state.

22. The apparatus of claim 13, wherein the standby processor places the apparatus into a fourth operational state in response to a user input, the fourth operational state entered from one of the first operational state, the second operational, and the third operational state, the fourth operational state powering all circuits in the apparatus.

23. The apparatus of claim 22, wherein the fourth operational state is power on.

24. An apparatus comprising:
means for operating in a first standby mode having a first operational state in response to a user input, the first operational state powering a portion of circuits in the apparatus;

means for detecting the presence of a signal received at an input to the apparatus, the received signal to be provided for display on a display device;

means for operating in a signal pass through mode in response to the presence of the signal, the signal pass through mode having a second operational state powering an additional portion of circuits for outputting the received signal, wherein in signal pass through mode at least some of the circuits in the apparatus are not powered; and wherein the apparatus enters a third mode having a third operational state from the first standby mode after not detecting the presence of the signal for a first period of time, the third mode powering only one or more circuits needed for the user input to the apparatus, and the apparatus enters the first standby mode from the third mode after a second time period and not in response to a user input.

25. The apparatus of claim 24, further comprising:
means for determining the presence of the signal received at the input to the apparatus when the apparatus is in the second operational state; and
means for returning to the first operational state if it is determined that the signal is no longer present at the input to the apparatus.

26. The apparatus of claim 24, wherein the first operational state is active standby and the second operational state is signal pass through.

27. The apparatus of claim 24, wherein the third mode is deep standby.

28. The apparatus of claim 27, wherein the signal is a high definition multimedia interface (HDMI) signal.

29. The apparatus of claim 28, wherein the HDMI signal is received from a content source device connected through an HDMI interface to the apparatus.

30. The apparatus of claim 28, wherein the means for detecting includes detecting the presence of at least one of a consumer electronics communication (CEC) interface signal and a plus five volt power signal in the HDMI signal.

31. The apparatus of claim 30, wherein the CEC interface signal is used to power on an HDMI signal processing circuit in the second operational state.

32. The apparatus of claim 24, wherein the portion of the circuits in the first operational state is a user input circuit and a signal receiver circuit.

33. The apparatus of claim 24, wherein the circuits for outputting the received signal from the apparatus is a signal processing circuit.

34. The apparatus of claim 24, further comprising means for entering a fourth operational state in response to a user input, the fourth operational state entered from one of the first operational state, the second operational, and the third operational state, the fourth operational state powering all circuits in the apparatus.

35. The apparatus of claim 34, wherein the fourth operational state is power on.

* * * * *